(12) United States Patent
Kustosch

(10) Patent No.: US 6,843,228 B2
(45) Date of Patent: Jan. 18, 2005

(54) METHOD AND ARRANGEMENT FOR CONTROLLING AN ACCELERATOR PEDAL IN AN INTERNAL COMBUSTION ENGINE

(75) Inventor: Mario Kustosch, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/385,526

(22) Filed: Mar. 12, 2003

(65) Prior Publication Data

US 2003/0172906 A1 Sep. 18, 2003

(30) Foreign Application Priority Data

Mar. 12, 2002 (DE) .......................................... 102 10 685

(51) Int. Cl.$^7$ .............................................. F02D 11/10
(52) U.S. Cl. ...................... 123/396; 123/399; 180/335
(58) Field of Search ................................ 123/396, 399; 180/335; 74/513

(56) References Cited

U.S. PATENT DOCUMENTS

| 3,983,767 A | 10/1976 | Lefeuvre | ...................... 74/513 |
| 4,510,906 A | * 4/1985 | Klatt | ........................... 123/396 |

* cited by examiner

*Primary Examiner*—Andrew M. Dolinar
(74) *Attorney, Agent, or Firm*—Walter Ottesen

(57) ABSTRACT

A method and an arrangement for controlling an accelerator pedal (1) provide a signal to the driver of a vehicle having an internal combustion engine of the entry into an uneconomical driving pattern via the accelerator pedal. A reset force (FPED) is applied to the accelerator pedal (1). A desired value (FPEDSOLL) for the reset force is increased in dependence upon a drop below a pregiven value for a degree of efficiency of the engine.

12 Claims, 3 Drawing Sheets

METHOD AND ARRANGEMENT FOR CONTROLLING AN ACCELERATOR PEDAL IN AN INTERNAL COMBUSTION ENGINE

BACKGROUND OF THE INVENTION

U.S. Pat. No. 3,983,767 discloses a reset arrangement for an accelerator pedal of a motor vehicle wherein the reset arrangement is driven in dependence upon an operating parameter of the vehicle.

SUMMARY OF THE INVENTION

The method and arrangement of the invention for controlling an accelerator pedal afford the advantage with respect to the reset arrangement referred to above that a desired value for the reset force is increased in dependence upon a drop below a pregiven value for a degree of efficiency of the engine. In this way, a signal can be provided to the driver of a motor vehicle, which is driven by an internal combustion engine, that the driver is in an engine load range of low efficiency. The signal is provided via the reset force on the accelerator pedal. A recommendation as to driving with optimized fuel consumption is thereby given to the driver.

The method of the invention is for controlling an accelerator pedal in an internal combustion engine, the accelerator pedal being subjected to a return force. The method includes the step of: increasing a desired value (FPEDSOLL) for the return force in dependence upon a drop below a pregiven value for an efficiency of the internal combustion engine.

It is especially advantageous when the degree of efficiency of the engine is determined in dependence upon a fuel enrichment. In this way, the formed reset force for the accelerator pedal is directly related to the fuel consumption.

A further advantage results when the pregiven value for the degree of efficiency of the engine is so selected that there is a drop below this value with the start of the fuel enrichment. A signal can be given early to the driver of the vehicle as to a greater consumption of fuel via the reset force of the accelerator pedal.

It is especially advantageous when the pregiven value for the degree of efficiency of the engine is assigned a first accelerator pedal position and the desired value for the reset force is formed in dependence upon the first accelerator pedal position and an instantaneous accelerator pedal position. In this way, the desired value for the reset force is easily determined.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
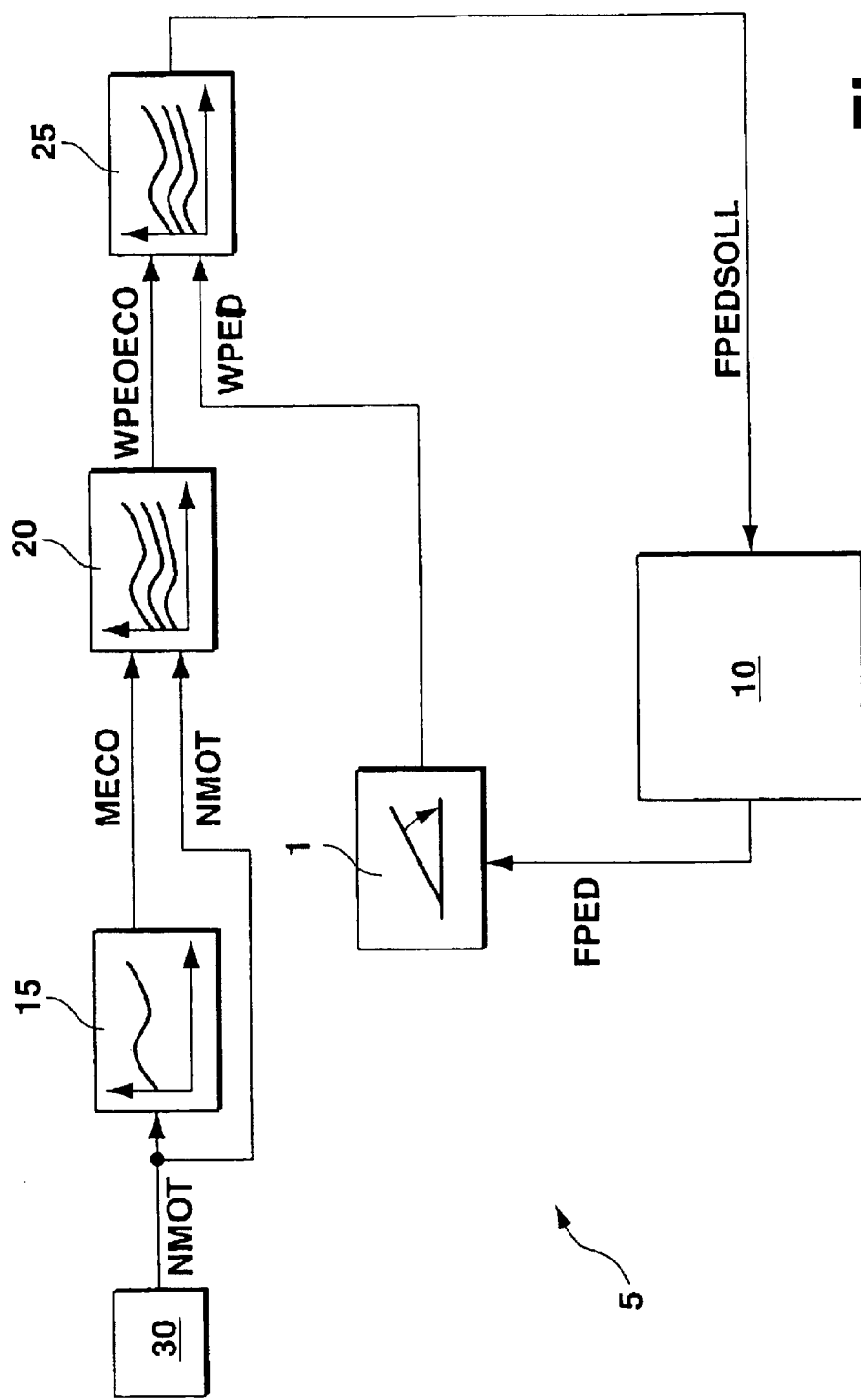
FIG. 1 is a block circuit diagram of an arrangement of the invention.

In FIG. 1, reference numeral 5 identifies an arrangement for controlling an accelerator pedal 1 in an internal combustion engine. The arrangement 5 includes means 30 for detecting an engine rpm NMOT of the internal combustion engine. The arrangement 5 furthermore includes means 15 for determining a limit engine desired torque MECO of the engine in dependence upon the detected engine rpm NMOT. For this purpose, the engine rpm NMOT is supplied to the means 15. The engine rpm NMOT is furthermore supplied together with the determined limit engine desired torque MECO to means 20 for determining a first accelerator pedal position WPEDECO. The means 20 determine the first accelerator pedal position WPEDECO thereby in dependence upon the limit engine desired torque MECO and the engine rpm NMOT. The determined first accelerator pedal position WPEDECO as well as an instantaneous accelerator pedal position WPED of the accelerator pedal 1 are supplied to means 25 for forming a desired value FPEDSOLL of a reset force for the accelerator pedal 1. The instantaneous accelerator pedal position WPED can, for example, be detected by an electronic measuring device (not shown in FIG. 1). The means 25 form the desired value FPEDSOLL for the reset force in dependence upon the first accelerator pedal position WPEDECO and the instantaneous accelerator pedal position WPED. The desired value FPEDSOLL of the reset force is supplied to means 10 for applying a reset force FPED on the accelerator pedal 1. The means 10 cause the reset force FPED to track the desired value FPEDSOLL in the sense of a desired-actual control. The means 10 then controls the accelerator pedal 1 with the reset force FPED which tracks the desired value FPEDSOLL and which, for example, is applied motorically or by means of a spring force to the accelerator pedal 1.

Figure 4:
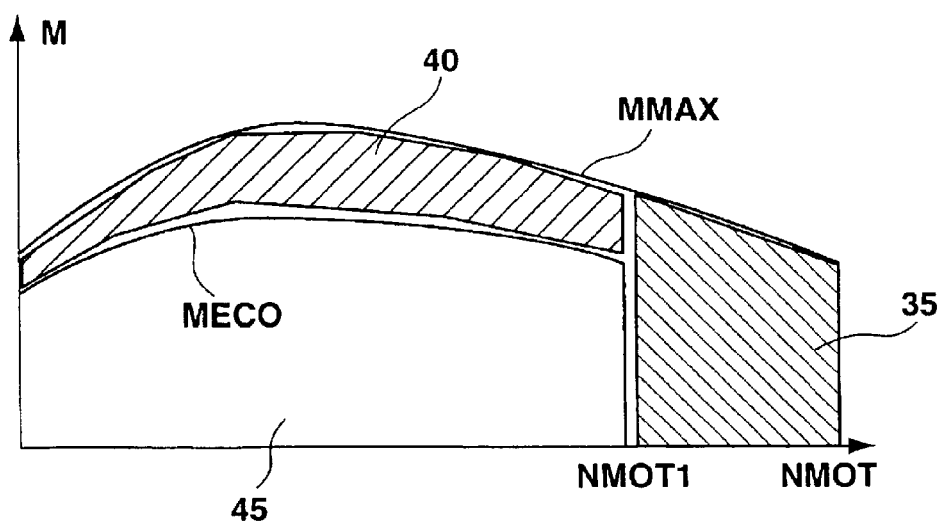

With the means 15, a characteristic line, which is identified here as an economy characteristic line, is realized with which an engine desired torque M is plotted as a function of the engine rpm NMOT. The characteristic line is shown in FIG. 4. If the engine rpm NMOT lies above a pregiven engine rpm NMOT1, then, for all engine desired torques M, which are less or equal to a maximum engine desired torque MMAX, a first range 35 is reached wherein a fuel enrichment for cooling the catalytic converter is realized to protect a catalytic converter when the same is present. In spark-ignition engines, a fuel enrichment of the air/fuel mixture leads to a departure of the stoichiometric mixture ratio. This can not only be used for cooling the catalytic converter but also for increasing the engine desired torque M. Accordingly, for engine rpms NMOT less than or equal to NMOT1, a fuel enrichment leads to an engine desired torque M which is less than or equal to the maximum engine desired torque MMAX and greater than a limit engine desired torque MECO. In this way, a second range 40 is realized in the diagram of FIG. 4 wherein the fuel enrichment is realized for increasing the engine desired torque M above the limit engine desired torque MECO and which is characterized as full load enrichment. The full load enrichment leads to an acceleration of the vehicle. A third range 45 in the economic characteristic line of FIG. 4 includes engine desired torques M which are less than or equal to the limit engine desired torque MECO for engine rpms NMOT equal to or less than NMOT1. The third range 45 can also be characterized as an economic range because no fuel enrichment takes place there. Accordingly, if the engine rpm NMOT exceeds the pregiven engine rpm NMOT1 or, for engine rpms NMOT less than or equal to NMOT1, the engine desired torque M exceeds the limit engine desired torque MECO, then fuel enrichment is recognized in each case. The fuel enrichment leads to a drop of the degree of efficiency of the engine. A pregiven value for the degree of efficiency of the engine can be selected in dependence upon the fuel enrichment. The pregiven value for the degree of efficiency of the engine is then so selected that there is a drop below this value with the start of the fuel enrichment. The pregiven value for the degree of efficiency in accordance with FIG. 4 thereby corresponds to the characteristic line shown there for the limit engine desired torque MECO on the one hand and for the pregiven engine rpm NMOT1 on the other hand. There is a drop below the pregiven value for the degree of efficiency of the engine when the engine desired torque M exceeds the limit engine desired torque MECO or the engine rpm NMOT exceeds the pregiven engine rpm NMOT1. In FIG. 1, only the case is considered by way of example wherein a drop of the pregiven value for the degree of efficiency of the engine takes place with the engine desired torque M exceeding the limit engine desired torque MECO and therefore the engine desired torque M lying in the second range 40. For this case, the means 15 determines the limit engine desired torque MECO in dependence upon the engine rpm NMOT being less than or equal to NMOT1.

The means 20 for determining the first accelerator pedal position WPEDECO realizes an inverse accelerator pedal characteristic field. The engine desired torque M is determined in the accelerator pedal characteristic field in dependence upon the accelerator pedal angle WPED and the engine rpm NMOT. In contrast, for the inverse accelerator pedal characteristic field, the first accelerator pedal position WPEDECO is determined from the limit engine desired torque MECO and the engine rpm NMOT. The first accelerator pedal position WPEDECO is thereby also an index for the pregiven value of the degree of efficiency of the engine. Accordingly, the first accelerator pedal position WPEDECO is assigned thereby to the limit engine desired value MECO via the inverse accelerator pedal characteristic field. The accelerator pedal position WPEDECO can also be characterized as a limit accelerator pedal position. The limit engine desired torque MECO can be also characterized as a pregiven engine desired torque.

Figure 2:
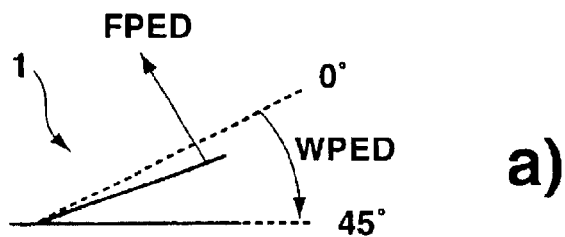
FIG. 2a is a schematic representation of an accelerator pedal.
FIG. 2b is a force characteristic field for a desired value of a reset force for the accelerator pedal.
Figure 2:
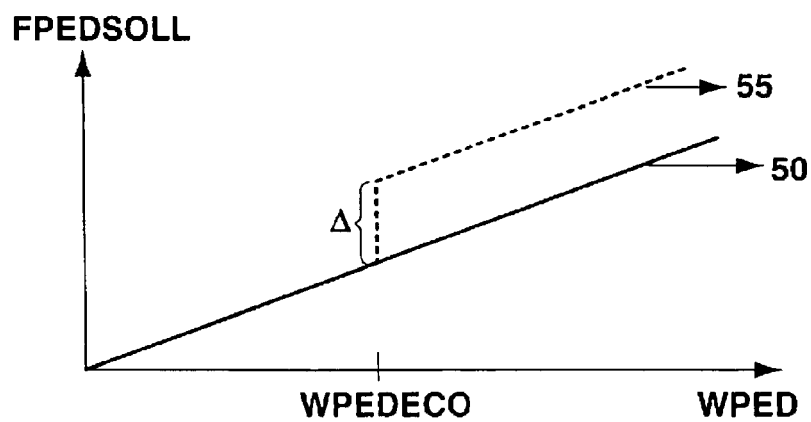

The means 25 form the desired value FPEDSOLL for the reset force on the basis of a force characteristic field according to FIG. 2b. In FIG. 2b, the desired value FPEDSOLL for the reset force is plotted as a function of the accelerator pedal position WPED. The conventional trace of the desired value FPEDSOLL as a function of accelerator pedal position WPED is shown by the reference numeral 50. This conventional trace 50 is, essentially, linearly increasing (that is, the desired value FPEDSOLL increases with increasing accelerator pedal position WPED between 0 degrees and 45 degrees in accordance with FIG. 2a) and thereby the reset force FPED on the accelerator pedal 1 increases proportionally which reset force tracks the desired value FPEDSOLL. According to the invention, the means 25 compares the instantaneous accelerator pedal position WPED to the first pregiven accelerator pedal position WPEDECO. If the accelerator pedal position WPED exceeds the first pregiven accelerator pedal position WPEDECO, then the desired value FPEDSOLL for the reset force is increased abruptly in this example as shown in FIG. 2b by the broken-line trace 55. Generally, a desired non-linear increase of the desired value FPEDSOLL for the reset force is possible or a linear increase of the desired value FPEDSOLL for the reset force is possible with a slope increased starting from the first pregiven accelerator pedal position WPEDELO. The trace of the desired value FPEDSOLL corresponds to the conventional trace 50 before reaching the first accelerator pedal position WPEDECO via the instantaneous accelerator pedal position WPED. As soon as the first accelerator pedal position WPEDECO is exceeded by the instantaneous accelerator pedal position WPED, the desired value FPEDSOLL is increased abruptly by a value $\Delta$ in this example. For instantaneous accelerator pedal positions WPED greater than WPEDECO, the desired value FPEDSOLL runs in accordance with the broken-line trace 55 with the same slope as the conventional trace 50, however, increased by the value $\Delta$.

In view of the above, the first accelerator pedal position WPEDECO also represents the pregiven value of the degree of efficiency of the engine. When the instantaneous accelerator pedal position WPED exceeds the first accelerator pedal position WPEDECO, there is a drop below the pregiven value for the degree of efficiency of the engine and the desired value FPEDSOLL for the reset force is abruptly increased.

Figure 3:
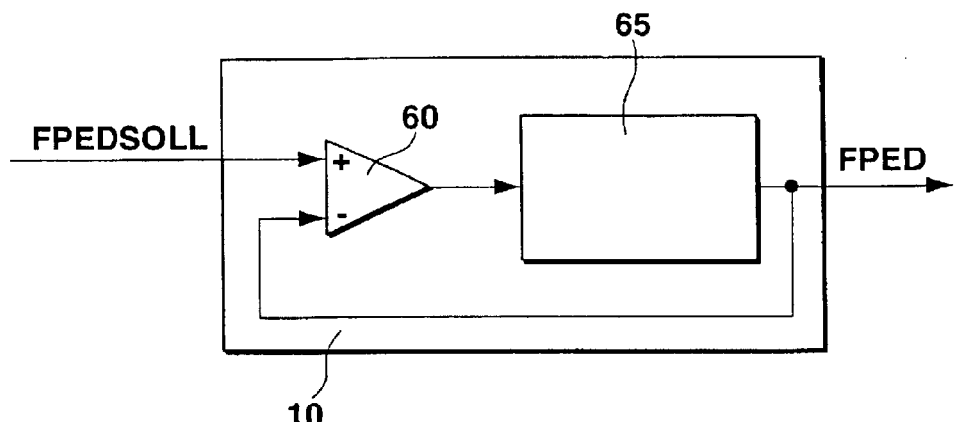
FIG. 3 is a schematic showing a control for the reset force of the accelerator; and, FIG. 4 is a characteristic line for showing the degree of efficiency of an internal combustion engine.

As described, the means 10 for applying the reset force FPED essentially defines a control and is shown in greater detail in FIG. 3. The means 10 includes a comparator 60 to which the desired value FPEDSOLL and the instantaneous reset force FPED are supplied. The comparator 60 forms the difference between the desired value FPEDSOLL and the instantaneous reset force FPED and outputs the formed difference value to a controller 65. The controller 65 has the task to control the applied difference value to 0 and output a corresponding reset force FPED which is again supplied to the comparator 60. When the discussion here is with respect to the instantaneous reset force FPED, this is a signal value which is compared to the desired value FPEDSOLL and which, on the other hand, after being outputted by the controller 65, is supplied to the accelerator pedal 1 for adjusting the corresponding reset force. In this way, the accelerator pedal 1 is driven by the means 10 to adjust the instantaneous reset force FPED which is controlled to the desired value FPEDSOLL by the controller 65.

In view of the above, when the driver of the vehicle, which is driven by the internal combustion engine, has actuated the accelerator pedal beyond the first accelerator pedal position WPEDECO, then a fuel enrichment occurs and there is a drop below the pregiven value for the degree of efficiency of the engine. This leads to the situation that the desired value FPEDSOLL for the reset force is increased abruptly in this example and the reset force FPED itself correspondingly tracks the desired value FPEDSOLL via the means 10. In this way, when the first accelerator pedal position WPEDECO is exceeded, the driver is provided in this example with a signal via an abrupt or at least almost abrupt increase of the reset force FPED at the accelerator pedal 1 that there is a drop below the pregiven value for the degree of efficiency of the engine and that an engine load range is reached with lower efficiency. In this way, a recommendation is given to the driver as to the consumption-optimized driving. When the driver eases the accelerator pedal 1 to the extent that there is a drop below the first pregiven accelerator pedal position WPEDECO, the abrupt change of the desired value FPEDSOLL and therefore the at least almost abrupt increase of the return force FPED on the accelerator pedal is withdrawn and the driver is thereby advised that the driver is again in the economic range 45 and therefore in a consumption-optimal range. On the other hand, by overcoming the at least almost abruptly increased return force FPED after exceeding the first accelerator pedal position WPEDECO, the driver nonetheless has the possibility to move out of the economic range 45 into the second range 40 and to select a sporty driving operation with corresponding acceleration and fuel enrichment.

For the case that the engine rpm NMOT exceeds the pregiven engine rpm NMOT1, the first accelerator pedal position WPEDECO provides a minimum accelerator pedal position for all engine desired torque possible with the corresponding engine rpm NMOT. Exceeding the first accelerator pedal position WPEDECO, which is determined in this way, then represents a start of the fuel enrichment with the pregiven engine rpm NMOT1 being exceeded for cooling the catalytic converter.

Alternatively, it can be provided that the fuel enrichment is detected when a pregiven wheel output desired torque RECO is exceeded in dependence upon a vehicle speed VFZG or when a pregiven vehicle speed VFZG1 is exceeded. In this case, the pregiven wheel output desired torque RECO assumes the role of the above-described limit engine desired torque MECO and the vehicle speed VFZG assumes the role of the above-described engine rpm NMOT. The pregiven vehicle speed VFZG1 assumes the role of the above-described pregiven engine rpm NMOT1. The characteristic field of FIG. 4 and the inverse accelerator pedal characteristic field are then to be adapted to the new quantities. Here, in lieu of the engine desired torque M of FIG. 4, the wheel output desired torque R is plotted and, in lieu of the maximum engine desired torque MMAX, the maximum wheel output desired torque RMAX is plotted. For the inverse accelerator pedal characteristic field, the first accelerator pedal position WPEDECO is determined in dependence upon the pregiven wheel output desired torque RECO and the vehicle speed VFZG is determined. Also, the descriptions for the above-described embodiment apply in a corresponding manner for this alternative embodiment.

It is understood that the foregoing description is that of the preferred embodiments of the invention and that various changes and modifications may be made thereto without departing from the spirit and scope of the invention as defined in the appended claims.

What is claimed is:

1. A method for controlling an accelerator pedal in an internal combustion engine, said accelerator pedal being subjected to a return force, the method comprising the step steps of:

increasing a desired value (FPEDSOLL) for said return force in dependence upon a drop below a pregiven value for an efficiency of said internal combustion engine; and, determining the efficiency of said internal combustion engine in dependence upon a fuel enrichment.

2. The method of claim 1, comprising the further step of selecting the pregiven value for said efficiency of said internal combustion engine in so that there is a drop below said value when an enrichment of the fuel begins.

3. The method of claim 2, comprising the further step of detecting the fuel enrichment when a pregiven engine desired torque (MECO) is exceeded in dependence upon an engine rpm (NMOT).

4. The method of claim 3, comprising the further step of detecting the fuel enrichment when a pregiven engine rpm (NMOT1) or a pregiven vehicle speed (VFZG1) is exceeded.

5. The method of claim 4, comprising the further step of detecting a fuel enrichment when a pregiven wheel output desired torque (RECO) is exceeded in dependence upon a vehicle speed (VFZG).

6. The method of claim 1, comprising the further steps of assigning the pregiven value for said efficiency of said internal combustion engine to a first accelerator pedal position; and, forming said desired value (FPEDSOLL) for said return force in dependence upon the first accelerator pedal position (WPEDECO) and an instantaneous accelerator pedal position (WPED).

7. The method of claim 6, wherein said desired value for said return force increases when said first accelerator pedal position (WPEDECO) is exceeded by the instantaneous accelerator pedal position (WPED).

8. The method of claim 7, wherein said desired value for said return force increases abruptly when said first accelerator pedal position (WPEDECO) is exceeded by the instantaneous accelerator pedal position (WPED).

9. The method of claim 7, comprising the further steps of: determining said first accelerator pedal position (WPEDECO) in dependence upon the pregiven engine desired torque (MECO) and the engine rpm (NMOT) or the pregiven wheel output desired torque (RECO) and the vehicle speed (VFZG).

10. An arrangement for controlling an accelerator pedal in an internal combustion engine, the arrangement comprising:

means for applying a return force to said accelerator pedal;

means for determining an efficiency of said engine; and, means for forming a desired value (FPEDSOLL) for said return force and for increasing the said desired value (FPEDSOLL) in dependence upon a drop below a pregiven value for the efficiency of said internal combustion engine; and, means for determining the efficiency of said internal combustion engine in dependence upon a fuel enrichment.

11. An arrangement for controlling an accelerator pedal in an internal combustion engine, the arrangement comprising:

means for applying a return force to said accelerator pedal;

means for determining an efficiency of said engine; and, means for forming a desired value (FPEDSOLL) for said return force and for increasing the said desired value (FPEDSOLL) in dependence upon a drop below a pregiven value for the efficiency of said internal combustion engine;

means for assigning the pregiven value for said efficiency of said internal combustion engine to a first accelerator pedal position; and, means for forming said desired value (FPEDSOLL) for said return force in dependence upon the first accelerator pedal position (WPEDECO) and an instantaneous accelerator pedal position (WPED).

12. A method for controlling an accelerator pedal in an internal combustion engine, said accelerator pedal being subjected to a return force, the method comprising the steps of:

increasing a desired value (FPEDSOLL) for said return force in dependence upon a drop below a pregiven value for an efficiency of said internal combustion engine;

assigning the pregiven value for said efficiency of said internal combustion engine to a first accelerator pedal position; and, forming said desired value (FPEDSOLL) for said return force in dependence upon the first accelerator pedal position (WPEDECO) and an instantaneous accelerator pedal position (WPED).

* * * * *